Patented Dec. 13, 1938

2,139,787

UNITED STATES PATENT OFFICE

2,139,787

COLORING CELLULOSE ESTERS

August Wingler, Leverkusen-I. G. Werk, and Heinrich Ohlendorf and Hans Lange, Dessau in Anhalt, Germany, assignors to General Aniline Works, Inc., New York, N. Y., a corporation of Delaware No Drawing. Application January 9, 1937, Serial No. 119,778. In Germany January 16, 1936

14 Claims. (Cl. 8—50)

The present invention relates to a process of coloring cellulose esters, especially cellulose acetate artificial silk, by a dyeing or printing process with azodyestuffs of the general formula:

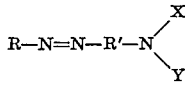

wherein R stands for the radical of a diazotization component, R' stands for an aromatic nucleus bearing the group

in para-position to the azo group, X stands for an alkylene oxide group, and Y stands for a member selected from the group consisting of hydrogen, hydrocarbon radicals and substituted hydrocarbon radicals, such as alkyl, alkenyl, hydroxyalkyl, alkoxyalkyl, aralkyl, and wherein in the molecule at most one acid salt forming group, such as the sulfonic acid or the carboxylic acid group, is present.

We wish it to be understood that the coloring of cellulose esters, especially cellulose acetate artificial silk, in mixed fabrics, i. e. material containing the cellulose acetate artificial silk in combination with other fibers, such as cotton and wool, is included within our invention.

The coloring of the cellulose esters, according to the present invention, is performed in the conventional manner; for example, when dyeing cellulose acetate artificial silk or material containing the same in accordance with the invention, a neutral or weakly alkaline dyeing bath containing the dyestuff either in solution or in a finely dispersed state, is preferably used, dyeing generally being performed at about 70–90° C., say for about an hour. When using the dyestuffs in accordance with the invention for printing cellulose acetate artificial silk or material containing the same, the dyestuff is worked into a printing color in the usual manner by finely dispersing the dyestuff, adding thereto a thickener and the required quantity of water, and printing and finishing as usual. Thereby printings and dyeings of various shades are obtained of good fastness properties and of good dischargeability.

The invention further refers to new azodyestuffs suitable for performing the present invention, more particularly it relates to azodyestuffs of the general formula:

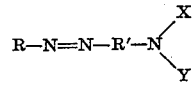

wherein R stands for the radical of a diazotization component bearing at least one substituent selected from the group consisting of the nitro group and the sulfonic acid group, R' stands for an aromatic nucleus bearing the group

in paraposition to the azo group, X stands for an alykylene oxide group and Y stands for a member selected from the group consisting of hydrogen, hydrocarbon radicals and substituted hydrocarbon radicals, such as alkyl, alkenyl, hydroxyalkyl, alkoxyalkyl, aralkyl, and wherein in the molecule at most one acid salt forming group, such as the sulfonic acid or the carboxylic acid group, is present.

These dyestuffs are obtainable by diazotizing an aromatic amine and coupling in an acid medium with an aromatic amine, in which one hydrogen atom of the amino group is substituted by an alkylenoxide group, and the other hydrogen atom of the amino group can be substituted by a hydrocarbon radical or a substituted hydrocarbon radical, the components thereby being selected in such a manner that the molecule contains at least one substituent selected from the group consisting of the sulfonic acid group and the nitro group, and at most one salt-forming acid group, such as the sulfonic acid group and the carboxylic acid group. The coupling components used in this process may be prepared by the processes suggested in U. S. Patents No. 1,790,042, issued January 27, 1931, and No. 1,845,403, issued February 16, 1932.

The following examples illustrate the invention. the parts being by weight.

Example 1

20 parts of para-nitraniline are diazotized in the customary manner, 25 parts of methylphenylamino-1.2-propylene oxide are dissolved in the cold with the addition of ice in dilute hydrochloric acid while maintaining a reaction weakly acid to Congo red, and at 0° C. while stirring, introduced into the solution of the diazotized para-nitraniline. After about half an hour the whole is neutralized by the addition, drop by drop, of a sodium acetate solution, until the acid reaction to Congo red has disappeared. Generally, coupling is then complete. The dyestuff, which is insoluble in water, is filtered with suction after the reaction mixture has been neutralized with sodium carbonate. The yield is nearly theoretical.

The dyestuff, which corresponds to the following formula:

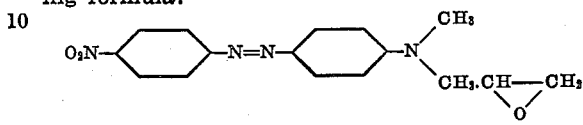

yields on cellulose acetate artificial silk when dyed in the usual manner yellowish scarlet shades. The dyeings show a good fastness to washing and light and are dischargeable to a pure white. In order to effect a good distribution in the dyeing bath the dyestuff may be distributed according to the known processes with the aid of dispersing agents.

Example 2

25 parts of 2-chloro-4-nitraniline are diazotized in glacial acetic acid with nitrosyl sulfuric acid. The diazotization mixture is strongly diluted with ice and water. 25 parts of methylphenylamino-1.2-propylene oxide are dissolved in the cold with the addition of ice in dilute hydrochloric acid while maintaining a reaction weakly acid to Congo red and at 0° C. while stirring, poured into the diazotization mixture prepared from 2-chloro-4-nitraniline referred to above. After about half an hour the whole is neutralized with a sodium acetate solution until the acid reaction to Congo red disappears. The dyestuff, which is difficultly soluble in water, is worked up as described in Example 1.

The dyestuff, which corresponds to the following formula:

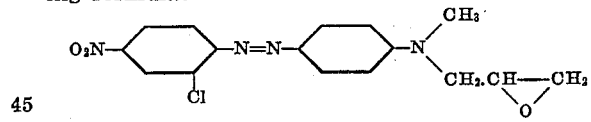

dyes cellulose acetate artificial silk bluish red.

The dyeings are of good fastness to washing and light and are dischargeable to a pure white.

Example 3

20 parts of para-nitraniline are diazotized in the customary manner. 29 parts of ethyl-m-tolylamino-1.2-propylene oxide are dissolved cold with the addition of ice in dilute hydrochloric acid and coupled with diazotized para-nitraniline, according to the directions given in Example 1.

0.1 g. of the dyestuff thus prepared is stirred into a paste with a small quantity of distilled water, and the paste is filled up to 150 ccs. with a soft water containing 3 g. of soap per liter. In this dyeing bath 5 g. of cellulose acetate artificial silk are dyed for 1 hour at a temperature of 75° C. Then the cellulose acetate artificial silk is rinsed in soft water and dried at moderate temperature. A bluish red dyeing of good fastness to washing and light and of a good dischargeability is thus obtained.

The dyestuff corresponds to the following formula:

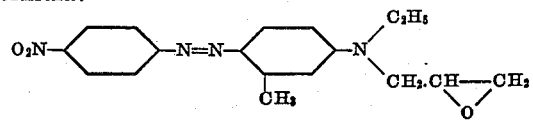

Example 4

26.2 parts of 6-bromo-2.4-dinitro-1-aminobenzene are diazotized in the usual manner and coupled with 24.9 parts of (3-methyl-6-methoxyphenyl-n-butylamino-1.2-propylene oxide while cooling with ice, and with the addition of such a quantity of acetate that coupling proceeds in an acetic acid medium.

The dyestuff, which corresponds to the following formula:

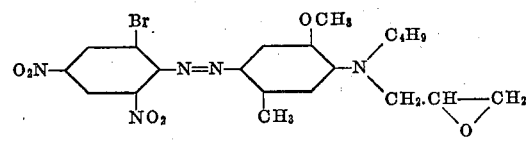

dyes cellulose acetate artificial silk reddish blue.

If there is used as diazo component 18.3 parts of 2.4-dinitro-1-aminobenzene, there is obtained a dyestuff which dyes cellulose acetate artificial silk bluish violet.

Example 5

32 parts of 4-nitraniline-2-sulfonic acid are diazotized in the usual manner. 25 parts of methylphenylamino-1.2-propylene oxide are dissolved cold with the addition of ice in dilute hydrochloric acid and combined with the above diazo compound at 0° C. The whole is neutralized with a sodium acetate solution until the acid reaction to Congo red has disappeared. The dyestuff, which is difficultly soluble in water, is filtered with suction.

3 g. of the dyestuff thus prepared in form of its sodium salt, 5 g. of dithiodiglycol, 42 g. of water and 50 g. of an aqueous gum solution (1:1) are intimately mixed. With this printing color cellulose acetate artificial silk tissue is printed in the usual manner. The print is dried, steamed for half an hour, rinsed and dried. A deep Bordeaux is thus obtained.

The dyestuff corresponds in its free state to the following formula:

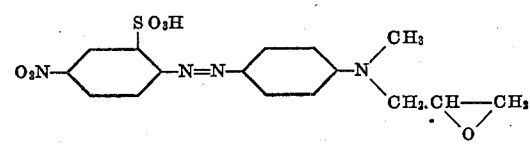

Example 6

25 parts of aniline-3-sulfonic acid are diazotized in the usual manner and coupled with 25 parts of methylphenylamine-1.2-propylene oxide, as indicated in Example 5.

The dyestuff, which corresponds in the free state to the following formula:

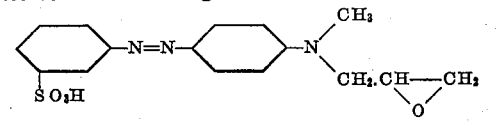

is soluble in water with the addition of sodium carbonate and dyes cellulose acetate artificial silk from a bath containing ammonium chloride with yellowish shades. The dyeings are dischargeable to a pure white.

In the following table there are given further combinations obtained in accordance with the invention and the shades obtainable therewith on cellulose acetate artificial silk.

| Diazo compound | Coupling compound | Shade |
|---|---|---|
| 2.4-dinitraniline | Methylphenylamino-1.2-propylene oxide | Bluish red. |
| 2.6-dichloro-4-nitraniline | ...do... | Orange. |
| 6-ethoxy-2-aminobenzo-thiazole | ...do... | Pink. |
| 5-nitro-2-amino-phenyl-methylsulfone | ...do... | Bluish red. |
| 4-methylsulfonyl-2-amino-phenylmethylsulfone. | ...do... | Orange. |
| Para-nitraniline | Ethylphenylamino-1.2-propylene oxide | Scarlet. |
| Para-aminobenzoic acid-ethyl ester | ...do... | Reddish yellow. |
| 6-bromo-2.4-dinitraniline | n-butyltolylamino-1.2-propylene oxide | Bluish violet. |

All the dyestuffs enumerated have a good affinity for the fiber and are in general distinguished by good fastness properties and a good dischargeability of the dyeings obtained therewith.

We claim:

1. The process which comprises coloring cellulose esters with a dyestuff of the general formula:

$$R-N=N-R'-N\genfrac{}{}{0pt}{}{X}{Y}$$

wherein R stands for the radical of a diazotization component of the benzene series, R' stands for a radical of the benzene series bearing the group $$N\genfrac{}{}{0pt}{}{X}{Y}$$

in para-position to the azo group, X stands for an alkylene oxide group, and Y stands for a member selected from the group consisting of hydrogen, alkyl, hydroxy alkyl, alkoxy alkyl and aralkyl radicals, and wherein in the molecule at most one acid salt forming group is present.

2. The process which comprises coloring cellulose esters with a dyestuff of the general formula:

$$R-N=N-R'-N\genfrac{}{}{0pt}{}{X}{Y}$$

wherein R stands for the radical of a diazotization component of the benzene series bearing at least one substituent selected from the group consisting of the nitro group and the sulfonic acid group, R' stands for a radical of the benzene series bearing the group $$N\genfrac{}{}{0pt}{}{X}{Y}$$

in para-position to the azo group, X stands for an alkylene oxide group, and Y stands for a member selected from the group consisting of hydrogen, alkyl, hydroxy alkyl, alkoxy alkyl and aralkyl radicals, and wherein in the molecule at most one acid salt forming group is present.

3. The process which comprises coloring cellulose esters with a dyestuff of the general formula:

$$R-N=N-R'-N\genfrac{}{}{0pt}{}{X}{Y}$$

wherein R stands for a radical of the benzene series bearing in para-position to the azo group a nitro group, R' stands for a radical of the benzene series bearing the group $$N\genfrac{}{}{0pt}{}{X}{Y}$$

in para-position to the azo group, X stands for an alkylene oxide group, and Y stands for a member selected from the group consisting of hydrogen, alkyl, hydroxy alkyl, alkoxy alkyl and aralkyl radicals, and wherein in the molecule at most one acid salt forming group is present.

4. The process which comprises coloring cellulose esters with a dyestuff of the general formula:

$$R-N=N-R'-N\genfrac{}{}{0pt}{}{X}{Y}$$

wherein R stands for a radical of the benzene series bearing in para-position to the azo group a nitro group, R' stands for a radical of the benzene series bearing the group $$N\genfrac{}{}{0pt}{}{X}{Y}$$

in para-position to the azo group, X stands for an alkylene oxide group, and Y stands for an alkyl group and wherein in the molecule at most one acid salt forming group is present.

5. The process which comprises coloring cellulose esters with the dyestuff of the following formula:

$$O_2N-\!\!\!\left\langle\;\right\rangle\!\!\!-N=N-\!\!\!\left\langle\;\right\rangle\!\!\!-N\genfrac{}{}{0pt}{}{C_2H_5}{CH_2.CH-\!\!-CH_2}$$
$$\phantom{O_2N-\!\!\!\langle\;\rangle-N=N-\!\!\!\langle\;\rangle-N\;CH_3\;\;}\underset{O}{\diagdown\!\diagup}$$

6. The process which comprises coloring cellulose acetate artificial silk with a dyestuff of the general formula $$R-N=N-R'-N\genfrac{}{}{0pt}{}{X}{Y}$$

wherein R stands for the radical of a diazotization component of the benzene series, R' stands for a radical of the benzene series bearing the group $$N\genfrac{}{}{0pt}{}{X}{Y}$$

in para-position to the azo group, X stands for an alkylene oxide group, and Y stands for a member selected from the group consisting of hydrogen, alkyl, hydroxy alkyl, alkoxy alkyl and aralkyl radicals, and wherein in the molecule at most one acid salt forming group is present.

7. The process which comprises coloring cellulose acetate artificial silk with a dyestuff of the general formula:

$$R-N=N-R'-N\genfrac{}{}{0pt}{}{X}{Y}$$

wherein R stands for the radical of a diazotization component of the benzene series bearing at least one substituent selected from the group consisting of the nitro group and the sulfonic acid group, R' stands for a radical of the benzene series bearing the group

in para-position to the azo group, X stands for an alkylene oxide group, and Y stands for a member selected from the group consisting of hydrogen, alkyl, hydroxy alkyl, alkoxy alkyl and aralkyl radicals, and wherein in the molecule at most one acid salt forming group is present.

8. The process which comprises coloring cellulose acetate artificial silk with a dyestuff of the general formula:

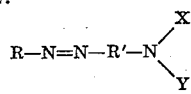

wherein R stands for a radical of the benzene series bearing in para-position to the azo group a nitro group, R' stands for a radical of the benzene series bearing the group

in para-position to the azo group, X stands for an alkylene oxide group, and Y stands for a member selected from the group consisting of hydrogen, alkyl, hydroxy alkyl, alkoxy alkyl and aralkyl radicals, and wherein in the molecule at most one acid salt forming group is present.

9. The process which comprises coloring cellulose acetate artificial silk with a dyestuff of the general formula:

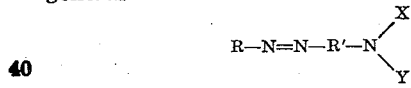

wherein R stands for a radical of the benzene series bearing in para-position to the azo group a nitro group, R' stands for a radical of the benzene series bearing the group

in para-position to the azo group, X stands for an alkylene oxide group, and Y stands for an alkyl group, and wherein in the molecule at most one acid salt forming group is present.

10. The process which comprises coloring cellulose acetate artificial silk with the dyestuff of the following formula:

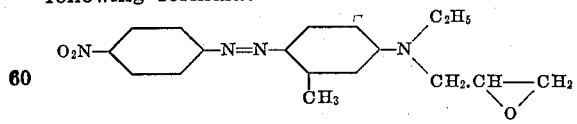

11. Azodyestuffs of the general formula:

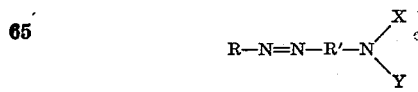

wherein R stands for the radical of a diazotization component of the benzene series bearing at least one substituent selected from the group consisting of the nitro group and the sulfonic acid group, R' stands for a radical of the benzene series bearing the group

in para-position to the azo group, X stands for an alkylene oxide group and Y stands for a member selected from the group consisting of hydrogen, alkyl, hydroxy alkyl, alkoxy alkyl and aralkyl radicals, and wherein in the molecule at most one acid salt forming group is present.

12. Azodyestuffs of the general formula:

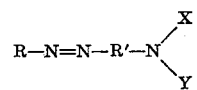

wherein R stands for a radical of the benzene series bearing in para-position to the azo group a nitro group, R' stands for a radical of the benzene series bearing the group

in para-position to the azo group, X stands for an alkylene oxide group, and Y stands for a member selected from the group consisting of hydrogen, alkyl, hydroxy alkyl, alkoxy alkyl and aralkyl radicals, and wherein in the molecule at most one acid salt forming group is present.

13. Azodyestuffs of the general formula:

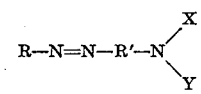

wherein R stands for a radical of the benzene series bearing in para-position to the azo group a nitro group, R' stands for a radical of the benzene series bearing the group

in para-position to the azo group, X stands for an alkylene oxide group, and Y stands for an alkyl group, and wherein in the molecule at most one acid salt forming group is present.

14. The azodyestuff of the following formula:

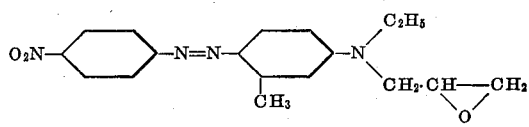

AUGUST WINGLER.
HEINRICH OHLENDORF.
HANS LANGE.